(12) United States Patent
Welnick et al.

(10) Patent No.: US 8,243,692 B2
(45) Date of Patent: Aug. 14, 2012

(54) ACCELERATED ALLOCATION OF NEIGHBOR SIGNALS TO CANDIDATES IN CELLULAR COMMUNICATIONS DEVICES

(75) Inventors: William E. Welnick, Poway, CA (US); William P. Alberth, Jr., Crystal Lake, IL (US); Brian D. Storm, Round Lake Beach, IL (US)

(73) Assignee: Motorola Mobility, Inc., Libertyville ( * ) Notice: Subject to any disclaimer, the term of this patent is extended or adjusted under 35 U.S.C. 154(b) by 2756 days.

(21) Appl. No.: 10/626,184

(22) Filed: Jul. 24, 2003

(65) Prior Publication Data

US 2005/0020267 A1    Jan. 27, 2005

(51) Int. Cl.
   *H04B 7/216*   (2006.01)
(52) U.S. Cl. ........ 370/335; 370/329; 370/331; 370/342; 455/436; 455/437
(58) Field of Classification Search ............ 455/455, 455/515, 516, 436–444, 450; 370/331, 252, 370/335, 342, 4 41, 479, 515, 320, 329, 491, 370/500; 375/367, 349, 147, 316
See application file for complete search history.

(56) References Cited

U.S. PATENT DOCUMENTS

| 6,122,334 | A | * | 9/2000 | Hughes ..................... 375/350 |
| 6,160,799 | A | * | 12/2000 | Krause et al. ............... 370/335 |
| 2004/0127220 | A1 | * | 7/2004 | Proctor, Jr. ................. 455/442 |
| 2004/0203838 | A1 | * | 10/2004 | Joshi et al. ................. 455/455 |
| 2005/0085230 | A1 | * | 4/2005 | Welnick et al. .............. 455/437 |

* cited by examiner

*Primary Examiner* — Anthony Addy
(74) *Attorney, Agent, or Firm* — Roland K. Bowler, II

(57) ABSTRACT

A method in a wireless communications device for allocating neighbor signals to a candidate set based on signal allocation criteria includes dynamically changing the signal allocation criteria based on at least one of a number of signals in an active signal set and on a signal quality of a strongest of signal in the active signal set. In one embodiment the signal allocation criteria is the length of an IIR filter.

12 Claims, 4 Drawing Sheets

ACCELERATED ALLOCATION OF NEIGHBOR SIGNALS TO CANDIDATES IN CELLULAR COMMUNICATIONS DEVICES

FIELD OF THE DISCLOSURE

The present disclosure relates generally to wireless cellular communications and more particularly to the identification of cellular communications neighbor signals suitable for hand-off-candidate status in wireless communications devices, for example, in CDMA communications handsets, and methods.

BACKGROUND

In CDMA cellular communications systems, as CDMA mobile stations move from location to location, neighboring pilot signals are added to and dropped from a candidate set maintained by the mobile station. Particularly, signals are promoted from the neighbor set to the candidate set when the signal satisfies certain criteria. The mobile station communicates candidate set information to the serving base-station for soft hand-off purposes.

In weak signal environments, neighbor signals are sometimes not promoted from the neighbor set to the candidate set fast enough during traffic channel operation to prevent dropping a call, which is undesirable. The delay associated with the promotion of neighbor signals to the candidate set is related to the criteria used to evaluate the suitability of the signals as hand-off candidates. In the Motorola V60c and V60i CDMA cellular handsets neighboring pilot signals assume a pre-candidate status if their signal strength, which is measured as $E_c/I_o$, meets or exceeds an ADD-candidate threshold, $T_{ADD}$. Pilot signals in the pre-candidate set are promoted to the candidate set only if the $T_{ADD}$ threshold is maintained over a pre-specified time period, for example, for a predetermined number of scans, thereby preventing the promotion of pilot signals to the candidate set based on spurious signal conditions. When a signal in the candidate set drops below a DROP-threshold, $T_{DROP}$ for a specified time period, the signal is dropped from the candidate set. The DROP-threshold, $T_{DROP}$, is less than the candidate threshold, $T_{ADD}$.

The various aspects, features and advantages of the disclosure will become more fully apparent to those having ordinary skill in the art upon careful consideration of the following Detailed Description thereof with the accompanying drawings described below.

DETAILED DESCRIPTION

Figure 1:
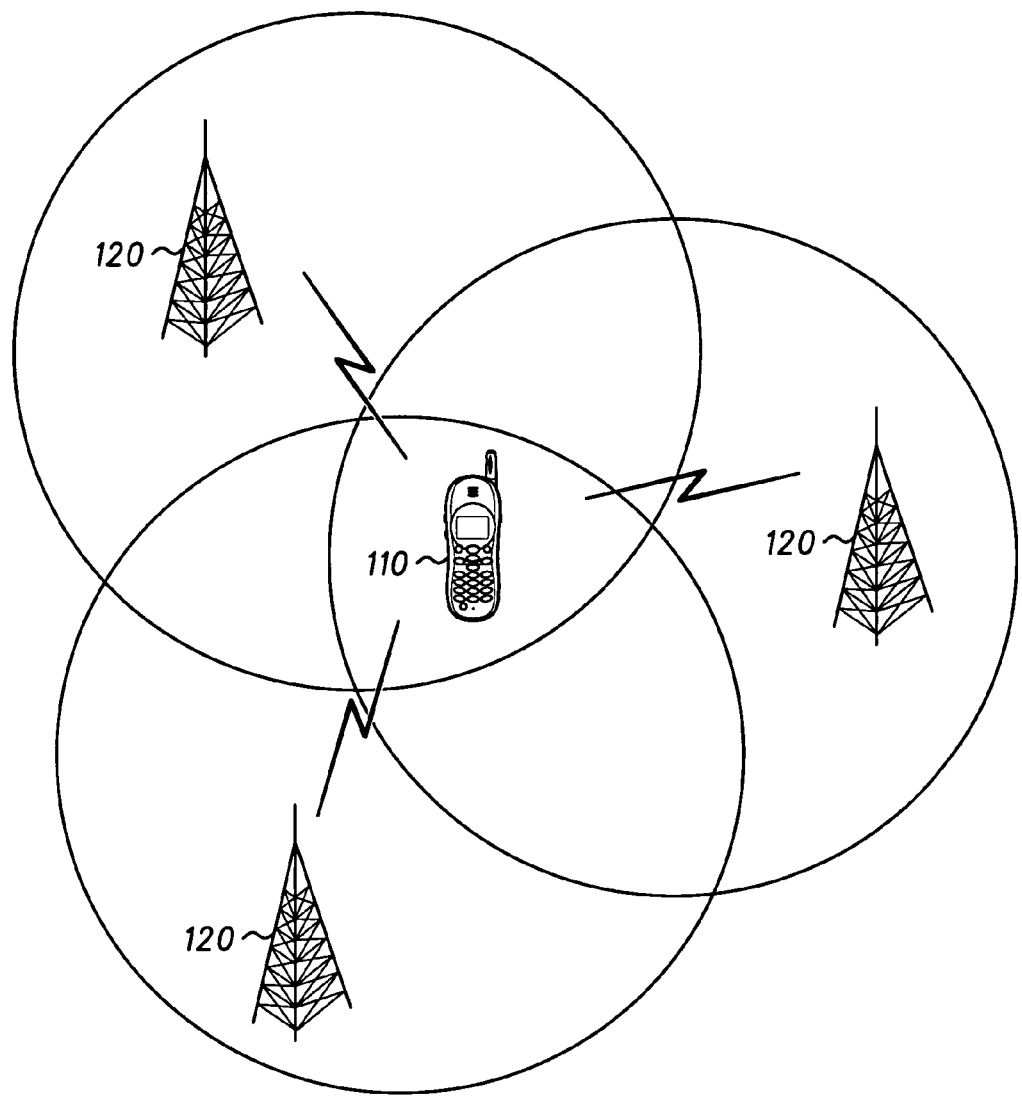
FIG. 1 is an exemplary wireless communications network wherein a mobile communication device allocates neighbor signals to a candidate set for soft handoff.

In the exemplary wireless communications system 100 of FIG. 1, a mobile wireless communications device 110 communicates with other parties, e.g., other mobile devices, servers, etc., via a communications network including a plurality of base stations 120 and other infrastructure, not illustrated, as the mobile device moves throughout the network, which is generally part of a system of networks including other cellular communications networks, data networks, the Internet, intranets, etc.

In some communications networks, the communications device 110 operates in soft-handoff mode with the one or more of the base stations, for example base stations 120 in FIG. 1. Communications networks of this type include generally CDMA communications networks, for example, CDMA 2000 cellular communications networks and IS-95 CDMA cellular communications networks in which the communications device is in soft handoff with one or more base station pilot signals. More generally, the communication network may be some other communications network wherein mobile wireless communications devices allocate or select neighbor signals based on some criteria. The disclosure is not limited to CDMA networks, which are only exemplary, as it pertains to communications networks employing soft handoff, and also to communications networks where dynamically adjusting criteria for signal selection or pre-selection is beneficial, as discussed more fully below.

According to one aspect of the disclosure, generally, a wireless communications device allocates received signals, for example, neighboring pilot signals received from neighboring base stations, to a candidate set based on signal allocation criteria. The received neighbor signals may be considered to be in a neighbor set. Thus signals are allocated or promoted from the neighbor set to the candidate set, either directly or indirectly. In some embodiments, the signals are allocated to an intermediate set, for example a pre-candidate set, before allocation to the candidate set, as discussed further below.

As the communications device moves about or other conditions change, the one or more active signals tend to change, for example, the signal quality fluctuates. The signal changes depend generally on many factors, for example, signal strength and channel conditions including fading, shadowing, etc. More generally, the signal quality fluctuations may be independent of any movement of the communications device, for example, the device may be a fixed location rather than a mobile device.

Figure 2:
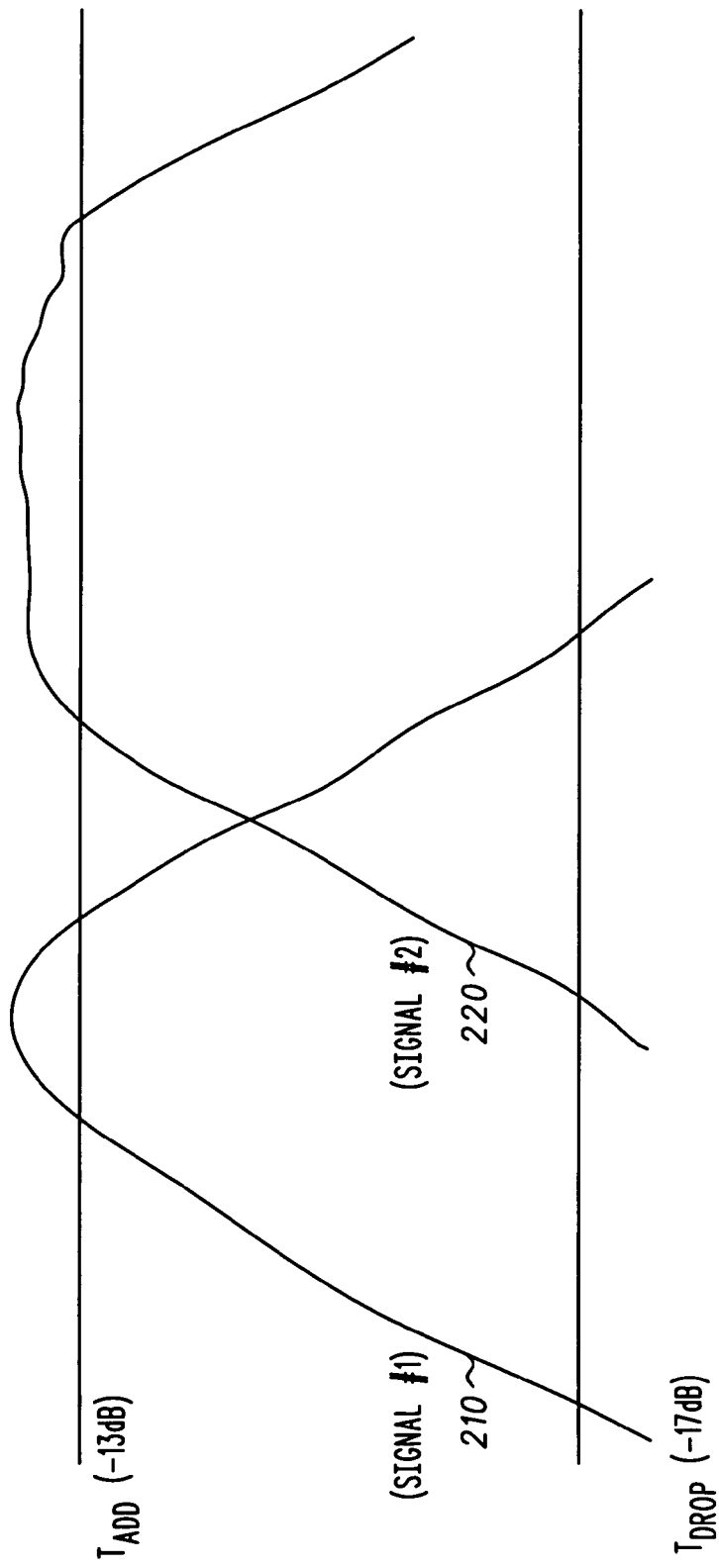
FIG. 2 illustrates exemplary time or position dependent variations in signal quality for first and second signals received by a communications device.

FIG. 2 illustrates exemplary time and/or position dependent signal quality plots for first and second signals 210 and 220 from the perspective of a communications device for example the communications device 110 in FIG. 1. In FIG. 2, signal quality is measured in dB. In one embodiment, generally, received signals are promoted or allocated to a candidate set when the signal quality meets or exceeds an allocation or ADD-threshold, $T_{ADD}$. Signals are removed from the candidate set when the signal quality drops below a DROP-threshold for a specified time period. The exemplary allocation threshold is −13 dB and the exemplary DROP-threshold is −17 dB, although these values are only exemplary. In some applications, the ADD and DROP thresholds are specified by wireless communications protocols and must be complied with by the communications device.

In some applications, the signal may also be required to meet or satisfy criteria other than momentarily satisfying the ADD-threshold before the signal is allocated to the candidate set. The signal may be required to satisfy one or more criteria requiring consideration over a temporal interval to prevent allocation of the signal as a result of a spurious event. The neighbor signal may be tested for compliance with the ADD-threshold several times, for example, over multiple scans or sweeps, before allocating the signals to the candidate set. Alternatively, the signal may require filtering by a filter having a specified filter length.

According to one embodiment of the disclosure, the signal allocation criteria is changed dynamically based on at least one of a number of signals in an active signal set and/or based on a signal quality of a most energetic signal in the active signal set, one or more of which the communications device may be in soft handoff. In one embodiment, the signal allocation criteria are changed dynamically when the number of signals in the active set changes relative to a threshold number. In another embodiment, the signal allocation criteria are changed dynamically when the number of signals in the signal strength of the strongest signal in the active set changes relative to a signal strength threshold.

In one embodiment, the signal allocation criteria is changed so that signals are allocated to the candidate set more quickly when the number of signals in the active set is less than a threshold number than when the number of signals in the active set is greater than the threshold number. In one particular application, neighbor set signals are allocated to a pre-candidate set when the neighbor signals are detected at or above the ADD-threshold or some other threshold on at least one sweep or scan, or upon meeting some other pre-candidate criteria. For example, neighbor signals are allocated to a pre-candidate set when the neighbor signals are detected at or above the ADD-threshold or some other threshold on at least one sweep or scan.

According to one exemplary embodiment, the allocation of neighbor signals to the candidate set may be delayed for a first delay interval when the number of signals in the active set is less than the threshold number, and the allocation of signals to the candidate set may be delayed for a second delay interval when the number of signals in the active set is greater than the threshold number. In one exemplary embodiment, the first delay interval is less than the second delay interval. Delay may also be changed by dynamically varying the length of a signal filter in the receiver, as discussed further below.

In one embodiment, one or more signals are promoted or allocated to the candidate set relatively immediately when the number of active signals drops below the active signal number threshold. Alternatively, the signals are allocated to the candidate upon evaluation for not more than one scan or sweep. The signals may be promoted or allocated to the candidate set directly from the neighbor set or from a pre-candidate set.

According to another exemplary embodiment, when the number of signals in the active set is greater than a threshold number, neighbor signals are allocated to the candidate set using criteria considered over more than one scanning period, and when the number of signals in the active set is less than the threshold number, neighbor signals are allocated to the candidate set using criteria considered over fewer scanning periods than when the number of signals in the active set is greater than the threshold number. Other schemes that reduce the time required to judge the adequacy of signals for candidate set status will also work. The signals may be promoted or allocated to the candidate set directly from the neighbor set or from a pre-candidate set.

Additional criteria may also be imposed on the decision to allocate or select signals. For example, when the number of signals in the active set is less than the threshold number, signals may be allocated to the candidate set more quickly only when the number of signals in the active set is less than a threshold number and when a quality of a strongest or most energetic of the active signals is less than a signal quality threshold.

Figure 3:
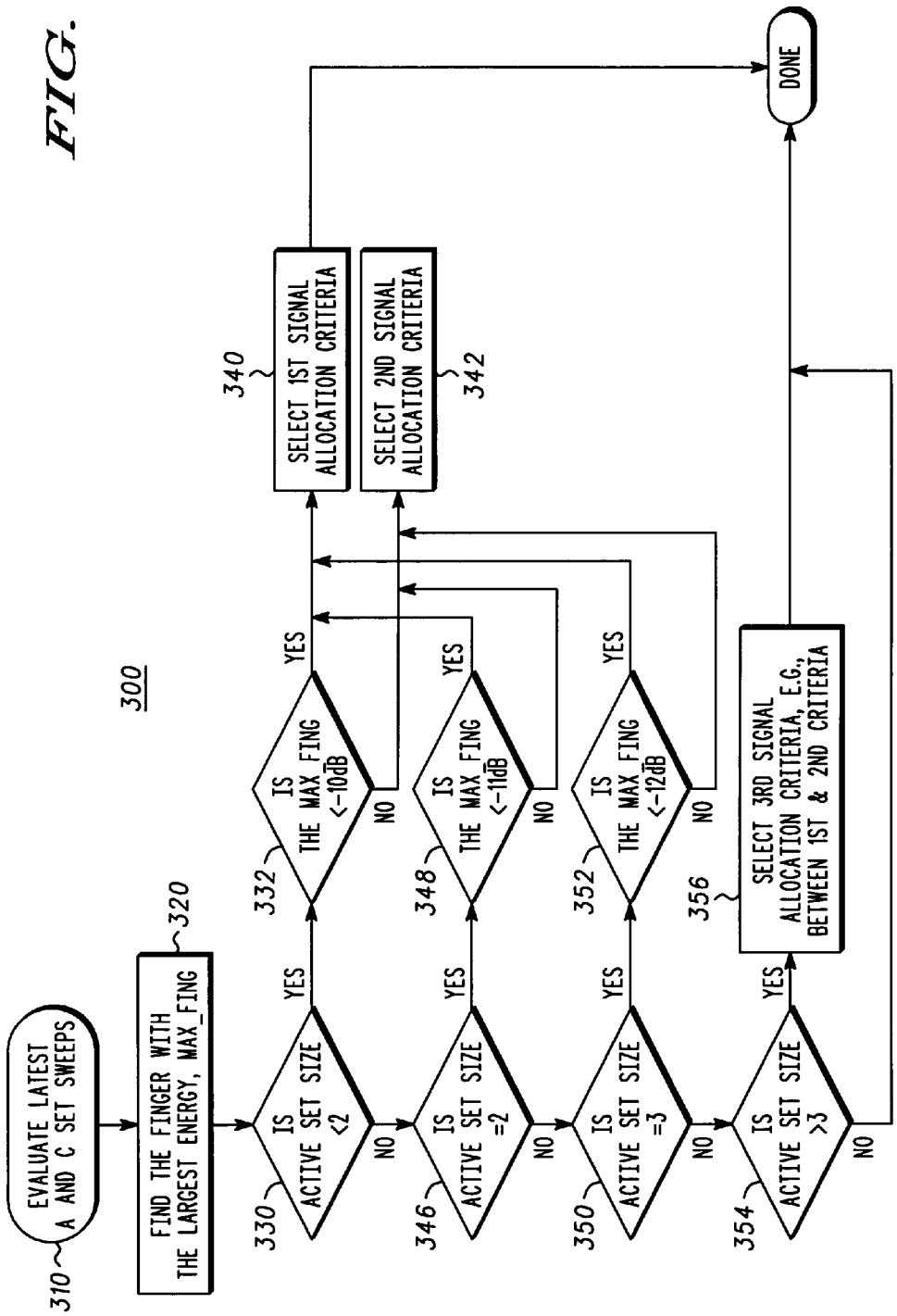
FIG. 3 is an exemplary process diagram for allocating neighbor signals to a candidate set.

In the exemplary process diagram 300 of FIG. 3, at block 310, the active set and candidate set signals are evaluated, for example, by measuring signal quality or some other signal characteristic. In CDMA and possible some other communications systems or networks, the quality of the signals in the active and candidate sets are evaluated by measuring Ec/Io. In CDMA and other communications devices, active signals are assigned to fingers of a rake receiver of the device. At block 320, the finger of the rake receiver having the most energy, max_fing, is identified.

At block 330, the number of signals in the active set is measured relative to a threshold, for example, by testing whether the number of active signals is less than a threshold number, which is "2" at block 320. In FIG. 3, at block 332, the quality of the most energetic rake finger, max_fing, is compared to a quality threshold, −10 dB in FIG. 3. In another embodiment, the threshold could be different, for example, −12 dB. If the quality of the most energetic rake finger is less than the threshold at block 332, then $1^{st}$ signal allocation criteria are selected at block 340, otherwise $2^{nd}$ signal allocation criteria are selected at block 342.

In one embodiment, the $1^{st}$ signal allocation criteria of block 340 are less demanding than the $2^{nd}$ allocation criteria of block 342. Thus the promotion or allocation of signals to the active set is accelerated when the $1^{st}$ criteria is used relative to when the $2^{nd}$ criteria is used. Acceleration of the allocation is desirable where the energy of the active signals is relatively low and when the number of active signals is low. In one embodiment, the $1^{st}$ criteria require less time to evaluate the adequacy of the signal for promotion to the candidate set. In another embodiment, the first criteria are evaluated over a few sweeps or scans, or the signals are filtered by a filter having a longer filter length as suggested above and discussed further below.

In FIG. 3, at block 346, if the number of signals in the active set is equal to the active set threshold number, then at block 348 the quality or energy of the most energetic rake finger, max_fing, is compared to a second quality threshold. In FIG. 3, the threshold is −11 dB, although in other embodiments it could be different. The $1^{st}$ criteria of block 340 are used to assess whether the signal should be allocated or selected if the threshold is not exceeded, otherwise the second criteria at block 342 are used.

In some embodiments, in FIG. 3 at block 350, if the number of signals in the active set is equal to the active set second threshold number, "3", then at block 352 the quality of the most energetic rake finger, max_fing, is compared to another threshold, −12 dB in FIG. 3 although other thresholds may be used in other embodiments. The $1^{st}$ criteria are used at block 340 if the threshold is not exceeded otherwise the second criteria are used at block 342.

In FIG. 3, at block 354, if the number of signals in the active set is greater than the second active set threshold number, "3", then at block 356 3rd criteria are used for evaluating the signals for allocation to the candidate set. In one embodiment, the $3^{rd}$ threshold is between the $1^{st}$ and $2^{nd}$ thresholds, for example, the time or number of scans required to evaluate the signals is between that of the $1^{st}$ and $2^{nd}$ criteria.

According to another embodiment, energy samples of the neighbor set signals are filtered with a filter of length "n" if the number of signals in the active set is above a threshold number, and the energy samples of the neighbor set signals are filtered with a filter of length m, m less than n, if the number of signals in the active set is below the threshold number. In one embodiment, the filter is an Infinite Impulse Response (IIR) filter, although in other embodiments other filters may be used, for example Finite Impulse Response (FIR) filters.

Signals are promoted or allocated to the candidate set when the filtered energy samples of the signals are greater than an allocation threshold. According to this aspect of the disclosure, the filter length is the criteria for allocating signals to the candidate set. Others may also be used. Applied to exemplary process diagram of FIG. 3, the $1^{st}$ criteria of block 340 has a corresponding filter length that is shorter than the corresponding filter length of $2^{nd}$ criteria of block 342. The filter length corresponding to the $3^{rd}$ criteria of block 356 is between the filter length for the $1^{st}$ and $2^{nd}$ criteria.

Figure 4:
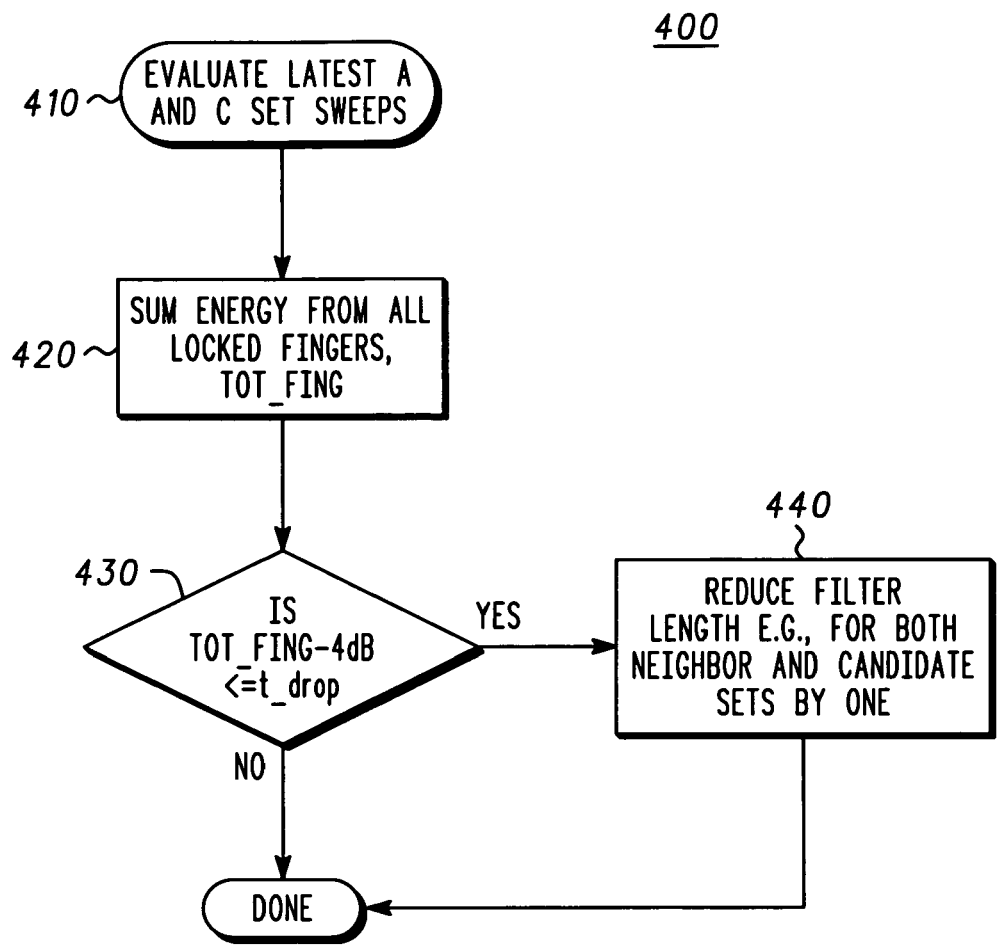
FIG. 4 is an exemplary process diagram for dynamically changing a filter length.

In the exemplary process diagram 400 of FIG. 4, at block 410, the active set and candidate set signals are evaluated, for example, by measuring signal quality or some other signal characteristic. In CDMA and possibly some other communications systems or networks, the quality of the signals in the active and candidate sets is evaluated by measuring Ec/Io. At block 420, the energy from all demodulated fingers of the rake receiver is summed, tot_fing. As noted, in CDMA communications devices, active signals are assigned to fingers of a rake receiver of the device. The demodulated fingers are also referred to herein as "locked" fingers. At block 430, the summed energy of the locked rake fingers is compared to a reference, for example, a DROP-threshold, $T_{DROP}$. In the exemplary embodiment, a determination is made whether the total finger energy, tot_fing after subtracting 4 dB, is less than or equal to the DROP-threshold, $T_{DROP}$. At block 440, if the condition at block 430 is satisfied, the filter length is reduced, e.g., n−1, for at least the candidate set and in another embodiment also for the neighbor signal set.

While the present disclosure and what are considered presently to be the best modes of the inventions have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A method in a wireless communications device that allocates neighbor signals to a candidate set, the method comprising:
   determining a number of signals in an active set;
   allocating signals to the candidate set more quickly when the number of signals in the active set is less than a threshold number than when the number of signals in the active set is greater than the threshold number,
   allocating signals to the candidate set includes delaying the allocation of signals to the candidate set for a first delay interval when the number of signals in the active set is less than the threshold number and delaying the allocation of signals to the candidate set for a second delay interval when the number of signals in the active set is greater than the threshold number,
   wherein the first delay interval is less than the second delay interval.

2. The method of claim 1, delaying the allocation of signals to the candidate set for the first delay interval includes immediately promoting signals to the candidate set when a strongest of the active signals does not meet a signal quality threshold.

3. The method of claim 1, when the number of signals in the active set is less than the threshold number, allocating signals to the candidate set more quickly only when the number of signals in the active set is less than a threshold number and when a quality of a strongest of the active signals is less than a first signal quality threshold.

4. The method of claim 3,
   if the number of signals in the active set is equal to the threshold number,
   allocating neighbor signals to the candidate set more quickly only when the number of signals in the active set is equal to the threshold number and when the strongest of the active signals does not meet a second signal quality threshold,
   the second signal quality threshold less than the first signal quality threshold.

5. The method of claim 1,
   the signals in the active set are assigned to fingers of a rake receiver,
   allocating signals to the candidate set more quickly only when the number of signals in the active set is less than the threshold number and when a most energetic rake finger has an energy greater than an energy threshold.

6. The method of claim 1,
   allocating neighboring signals to the candidate set based on signal promotion criteria,
   allocating signals to the candidate set when the number of signals in the active set is less than the threshold number based on consideration of signal promotion criteria for not more than one scanning period.

7. The method of claim 1, allocating signals to the candidate from a pre-candidate set.

8. A method in a wireless communications device that allocates neighbor signals to a candidate set based on criteria considered over at least one scanning period, the method comprising:
   determining a number of signals in an active set;
   when the number of signals in the active set is greater than a threshold number, allocating neighbor signals to the candidate set using criteria considered over more than one scanning period;
   when the number of signals in the active set is less than the threshold number, allocating neighbor signals to the candidate set using criteria considered over fewer scanning periods than when the number of signals in the active set is greater than the threshold number.

9. The method of claim 8, allocating neighbor signals to the candidate set using criteria obtained over a single scanning period when the number of signals in the active set is less than the threshold number.

10. The method of claim 8,
    when the number of signals in the active set is less than the threshold number,
    allocating neighbor signals to the candidate set using criteria considered over fewer scanning periods only when the number of signals in the active set is less than the threshold number and when a strongest of the active signals does not meet a first signal quality threshold.

11. The method of claim 10,
    if the number of signals in the active set is equal to the threshold number,
    allocating neighbor signals to the candidate set using criteria considered over fewer scanning periods only when the number of signals in the active set is equal to the threshold number and when the strongest of the active signals does not meet a second signal quality threshold,
    the second signal quality threshold less than the first signal quality threshold.

12. The method of claim 8,
    the signals in the active set are assigned to fingers of a rake receiver,
    allocating signals to the candidate set using criteria considered over fewer scanning periods only when the number of signals in the active set is less than the threshold number and when a most energetic rake finger has an energy greater than an energy threshold.

* * * * *